United States Patent
Zhang

(10) Patent No.: US 10,762,331 B1
(45) Date of Patent: Sep. 1, 2020

(54) THREE-DIMENSIONAL (3D) DEPTH AND TWO-DIMENSIONAL (2D) IMAGING SYSTEMS AND METHODS FOR AUTOMATIC CONTAINER DOOR STATUS RECOGNITION

(71) Applicant: ZEBRA TECHNOLOGIES CORPORATION, Lincolnshire, IL (US)

(72) Inventor: Yan Zhang, Buffalo Grove, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/599,506

(22) Filed: Oct. 11, 2019

(51) Int. Cl.
| | | |
|---|---|---|
| G06K 9/00 | (2006.01) | |
| H04N 13/254 | (2018.01) | |
| G06Q 10/08 | (2012.01) | |
| G06K 9/62 | (2006.01) | |
| H04N 13/25 | (2018.01) | |
| G06T 7/60 | (2017.01) | |
| G06T 7/62 | (2017.01) | |
| G06T 7/50 | (2017.01) | |

(52) U.S. Cl.
CPC ..... G06K 9/00201 (2013.01); G06K 9/00624 (2013.01); G06K 9/627 (2013.01); G06Q 10/083 (2013.01); H04N 13/25 (2018.05); H04N 13/254 (2018.05)

(58) Field of Classification Search
CPC ............ G06K 9/00201; G06K 9/3241; G06K 9/00624; G06K 9/627; G06K 9/00771; G06T 2207/10028; G06T 7/50; G06T 7/60; G06Q 10/083; H04N 13/254; H04N 13/25

See application file for complete search history.

(56) References Cited

U.S. PATENT DOCUMENTS

| | | | | |
|---|---|---|---|---|
| 7,940,955 | B2 * | 5/2011 | Zhang | G06K 9/3241 |
| | | | | 382/100 |
| 9,648,446 | B2 * | 5/2017 | Neves | H04W 4/70 |
| 9,940,730 | B2 * | 4/2018 | Zhang | G06T 7/62 |
| 10,034,122 | B2 * | 7/2018 | Neves | H04W 4/70 |
| 10,056,568 | B2 * | 8/2018 | Min | H01L 51/0097 |
| 10,118,576 | B2 * | 11/2018 | Breed | B60N 2/0232 |
| 10,268,892 | B1 * | 4/2019 | Miller | H04B 1/3888 |
| 10,473,594 | B2 * | 11/2019 | Heikkila | G06T 7/75 |
| 10,628,772 | B2 * | 4/2020 | Krishnamurthy | G06Q 50/28 |
| 10,630,944 | B2 * | 4/2020 | Magal | G06K 9/00718 |

(Continued)

Primary Examiner — Brian P Yenke
(74) Attorney, Agent, or Firm — Yuri Astvatsaturov

(57) ABSTRACT

Three-dimensional (3D) depth imaging systems and methods are disclosed for automatic container door status recognition. A 3D-depth camera captures 3D image data of a shipping container located in a predefined search space during a shipping container loading session. A container recognition application (app) receives the 3D image data, and determines therefrom a container point cloud representative of the shipping container, and a 3D image door area data subset defining one or more door areas of one or more corresponding doors of the shipping container. The container recognition app determines, from the 3D image door area data subset, a status type, of each of the one or more corresponding doors, selected from one of: (a) a door opened status type, (b) a door closed status type, or (c) a door partially closed status type.

26 Claims, 8 Drawing Sheets

(56) References Cited

U.S. PATENT DOCUMENTS

| | | | |
|---|---|---|---|
| 2009/0201152 A1* | 8/2009 | Karr | G01S 15/876 340/545.6 |
| 2017/0178333 A1* | 6/2017 | Zhang | G06T 7/0004 |
| 2019/0197455 A1* | 6/2019 | Krishnamurthy | G06Q 10/06393 |
| 2019/0197701 A1* | 6/2019 | Krishnamurthy | G06T 7/254 |
| 2019/0197719 A1* | 6/2019 | Barish | G06K 9/00201 |
| 2019/0355144 A1* | 11/2019 | Korobov | G06Q 10/083 |
| 2020/0014888 A1* | 1/2020 | Magal | G06K 9/00718 |
| 2020/0077383 A1* | 3/2020 | Zhang | H04W 72/0413 |
| 2020/0103548 A1* | 4/2020 | Yu | G01V 5/0083 |

* cited by examiner

THREE-DIMENSIONAL (3D) DEPTH AND TWO-DIMENSIONAL (2D) IMAGING SYSTEMS AND METHODS FOR AUTOMATIC CONTAINER DOOR STATUS RECOGNITION

BACKGROUND OF THE INVENTION

In the transportation industry, shipping containers (e.g., shipping containers as used in air and/or ground transportation and shipping, such as unit load devices (ULDs)) are typically loaded using a variety of different techniques that take into account a variety of different sizes and configurations of boxes, packages, or other items for shipping or transit. In addition, shipping containers, themselves, typically have various sizes and storage capacities (e.g., where such shipping containers are constructed to handle different cargo sizes, loads and/or configurations). All of the various loading techniques, box sizes/configurations, and shipping container sizes/configurations create various permutations of loading strategies, techniques, and differences in overall loading operations that are difficult for loaders and/or managers overseeing loading of such commercial trailers to manage.

Such various permutations of loading strategies, sizes, and configurations create problems in tracking performance or quality of loading metrics across different personnel (e.g., loaders), each of which may be located in different geographic locations and/or employ different loading regimens. In particular, loaders or managers may desire a greater understanding and improved metrics relating to the efficiency of how their shipping containers are loaded so that they can employ or make better management decisions to improve loading time or otherwise loading efficiency for logistical operations associated with shipping containers.

In addition, problems arise from traditional shipping container loading strategies and techniques (e.g., such as traditional loading strategies for ULD containers). For example, during loading, it is often difficult to track the loading progress or status of a shipping container, as loaders move and arrange packages in or around the shipping container. This creates problems with loading logistics and decreases operational efficiencies within warehouses or other loading facilities, especially within large facilities that house tens of hundreds of shipping containers, which must be processed within a set period of time to meet shipping deadlines or other shipping standards.

Conventional techniques, including manually monitoring loading status of shipping containers, including door status, can be untenable, especially at large facilities. Such manual techniques tend to fail to provide an updated or current status of loading of shipping containers within a shipping facility, especially at large shipping facilities where there is generally a desire to track status of great many shipping containers across a wide storage area.

Accordingly, there is a need for three-dimensional (3D) depth imaging systems and methods for automatic container door status recognition as described further herein.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
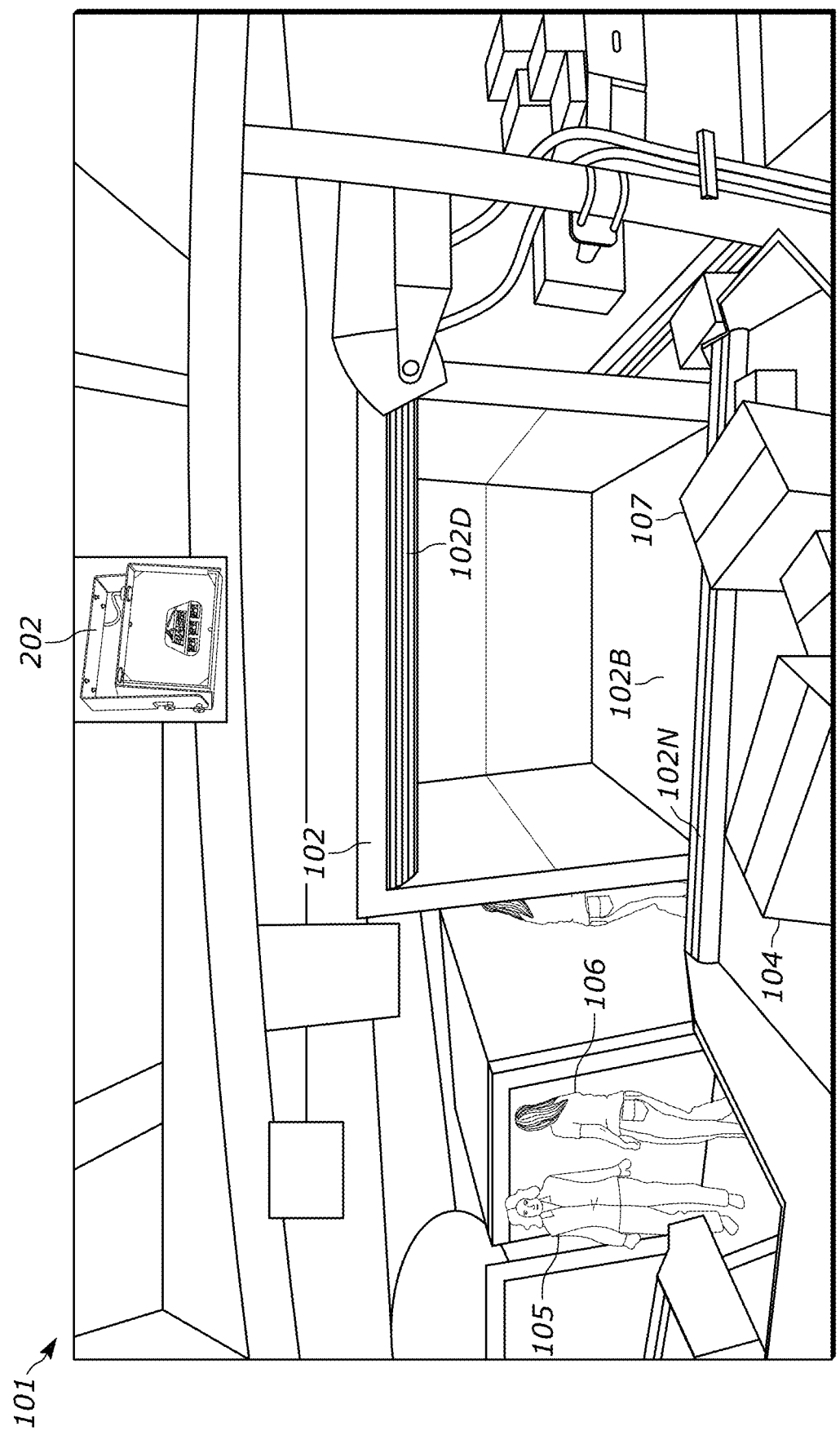
FIG. 1A is a perspective view, as seen from above, of a predefined search space of a loading facility that depicts a load monitoring unit (LMU) having a 3D-depth camera oriented in a direction to capture 3D image data of a shipping container during a shipping container loading session, where the shipping container is associated with an door opened status type, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Three-dimensional (3D) imaging systems and methods are described herein for automatic container door status recognition. More generally, the disclosures herein relate to providing container loading analytics (CLA), such as fullness analytics. Many operationally insightful metrics can be derived from the door status of a shipping container. Such metrics may include the loading time of the shipping container, the idle time of the shipping container, such as the idle time of the shipping container before it is loaded and after the door is closed and the shipping container pulled away. Such metrics may allow shippers (e.g., including shipping or packing personal) to recognize and receive alerts as to a container open, close, or other status, which are useful metrics for CLA analytics systems and to end-users in terms of providing a loading status.

The main challenge of recognizing the container door status is the large variation of the door structure, material, and resulted rigidity across multiple container types. Some doors are roll-able canvas panels and some have multiple side-by-side metal panels. The present disclosure proposes an efficient, accurate, and robust approach to automatically determine container door status during a normal container loading procedure. This approach improves efficiency and accuracy of known analytical algorithms. For example, the present disclosure describes 3D and 2D imaging systems and methods regarding recognizing shipping container door open, close, and partial statuses for a variety of shipping container types. For example, embodiments of the present disclosure allow for imaging of multiple types of shipping containers, for example, ULDs including AMJ, AAD, AKE, AYY, SAA, APE, and AQF types.

In addition, the present disclosure describes 3D and 2D imaging systems and methods for estimating the height of a partially closed/dropped door panel for shipping containers having modifiable/roll-able doors.

In still further embodiments, the present disclosure describes image analysis and machine learning techniques to determine container door statuses using both depth (3D) image data and/or color (2D) image data. That is, the imaging systems and methods may utilize both machine learning techniques on 2D image data (e.g., on color or pixel data) and 3D image data (e.g., on geometric analysis on depth images). In this way, the photometric information in the 2D image along with the geometric information in the 3D image data can provide distinctness of container door(s) compared with the surrounding of the shipping container, resulting in improved accuracy of the system as a whole. For example, various embodiments include systems and methods for door status recognition using both color and depth images; door status recognition for single and/or split scale shipping containers; container door status recognition for shipping container having one or more split doors; container door status recognition using temporal filtering; and container door height estimation of a partially closed shipping container door. The imaging systems and methods described herein may be applied or used with all types of shipping containers (e.g., all ULD types) having multiple configuration types, including single door, split doors, etc.

As will be described further herein, embodiments of the present disclosure simplify and automate the calibration efforts for multiple types of containers. Without benefits of the present disclosure, calibration efforts would remain substantial and tedious.

Accordingly, in various embodiments disclosed herein, a 3D depth imaging system is disclosed for automatic container door status recognition. The 3D depth imaging system may include a 3D-depth camera configured to capture 3D image data. The 3D-depth camera may be oriented in a direction to capture 3D image data of a shipping container located in a predefined search space during a shipping container loading session. In addition, the shipping container may have a shipping container type.

The 3D depth imaging system may further include a container recognition application (app) configured to execute on one or more processors and to receive the 3D image data. The container recognition app may be configured to determine, based on the 3D image data, a container point cloud representative of the shipping container. In addition, the container recognition app may be further configured to execute on the one or more processors to determine, from the 3D image data, a 3D image door area data subset defining one or more door areas of one or more corresponding doors of the shipping container. Each door area of the one or more door areas may comprise a near-door image data section and a behind-door image data section.

In addition, the container recognition app of the 3D depth imaging system may further be configured to execute on the one or more processors to determine, from the 3D image door area data subset, a status type of each of the one or more corresponding doors. For example, the status type may be selected from one of: (a) a door opened status type, (b) a door closed status type, or (c) a door partially closed status type.

In addition, a 3D depth imaging method is disclosed for automatic container door status recognition. The 3D depth imaging method may include capturing, by a 3D-depth camera, 3D image data of a shipping container located in a predefined search space during a shipping container loading session. The shipping container may having a shipping container type.

The 3D depth imaging method may further include receiving, by a container recognition application (app) executing on one or more processors, the 3D image data.

The 3D depth imaging method may further include determining, by the container recognition app based on the 3D image data, a container point cloud representative of the shipping container.

The 3D depth imaging method may further include determining, by the container recognition app from the 3D image data, a 3D image door area data subset defining one or more door areas of one or more corresponding doors of the shipping container. Each door area of the one or more door areas may comprise a near-door image data section and a behind-door image data section.

The 3D depth imaging method may further include determining, by the container recognition app from the 3D image door area data subset, a status type of each of the one or more corresponding doors. The status type may be selected from one of: (a) a door opened status type, (b) a door closed status type, or (c) a door partially closed status type.

The 3D depth imaging systems and methods disclosed herein may be further appreciated by the various Figures disclosed herein.

FIG. 1A is a perspective view, as seen from above, of a predefined search space of a loading facility that depicts a load monitoring unit (LMU) having a 3D-depth camera oriented in a direction to capture 3D image data of a shipping container during a shipping container loading session, where the shipping container is associated with an door opened status type, in accordance with example embodiments herein. As depicted, shipping container 102 has a shipping container type of "AMJ." Generally, a shipping container is selected from one of several differently dimensioned containers. In various embodiments, shipping containers may comprise any type of unit load device (ULD). For example, a shipping container type may be of any ULD type, including, for example, any of an AMJ type, an AAD type, an AKE type, an AYY type, a SAA type, and APE type, or an AQF type. For ULD shipping containers, the first letter (e.g., "A" for "Certified aircraft container") indicates a specific type of ULD container, such as certified, thermal, etc.; the second letter represents base size in terms of dimensions (e.g., "M" for 96×125 inch); and the third letter represents a side contour size and shape (e.g., "J" for a cube shaped ULD container having a diagonal sloping roof portion on one side only). More generally, however, a shipping container may be any aircraft-based shipping container.

Predefined search space 101 may be determined based on the shipping container size, dimensions, or otherwise configuration and/or the area in which the shipping area is localized. For example, in one embodiment, predefined search space 101 may be determined based on ULD type, shape, or position within a general area. As shown in FIG. 1A, for example, predefined search space 101 is determined based on the size and dimensions of the shipping container 102 which is of type AMJ. In general, predefined search space 101 is defined so as to completely (or at least partially) include or image the shipping container. Shipping container 102 may include a door 102d, which is depicted as opened or in an opened position. As described herein, in various embodiments, the opened positioned may be associated with a door opened status type. Behind door 102d, is an interior area 102b of shipping container 102. Near door area102d is a frontal area 102n near the opening of door 102d of shipping container 102.

Figure 1B:
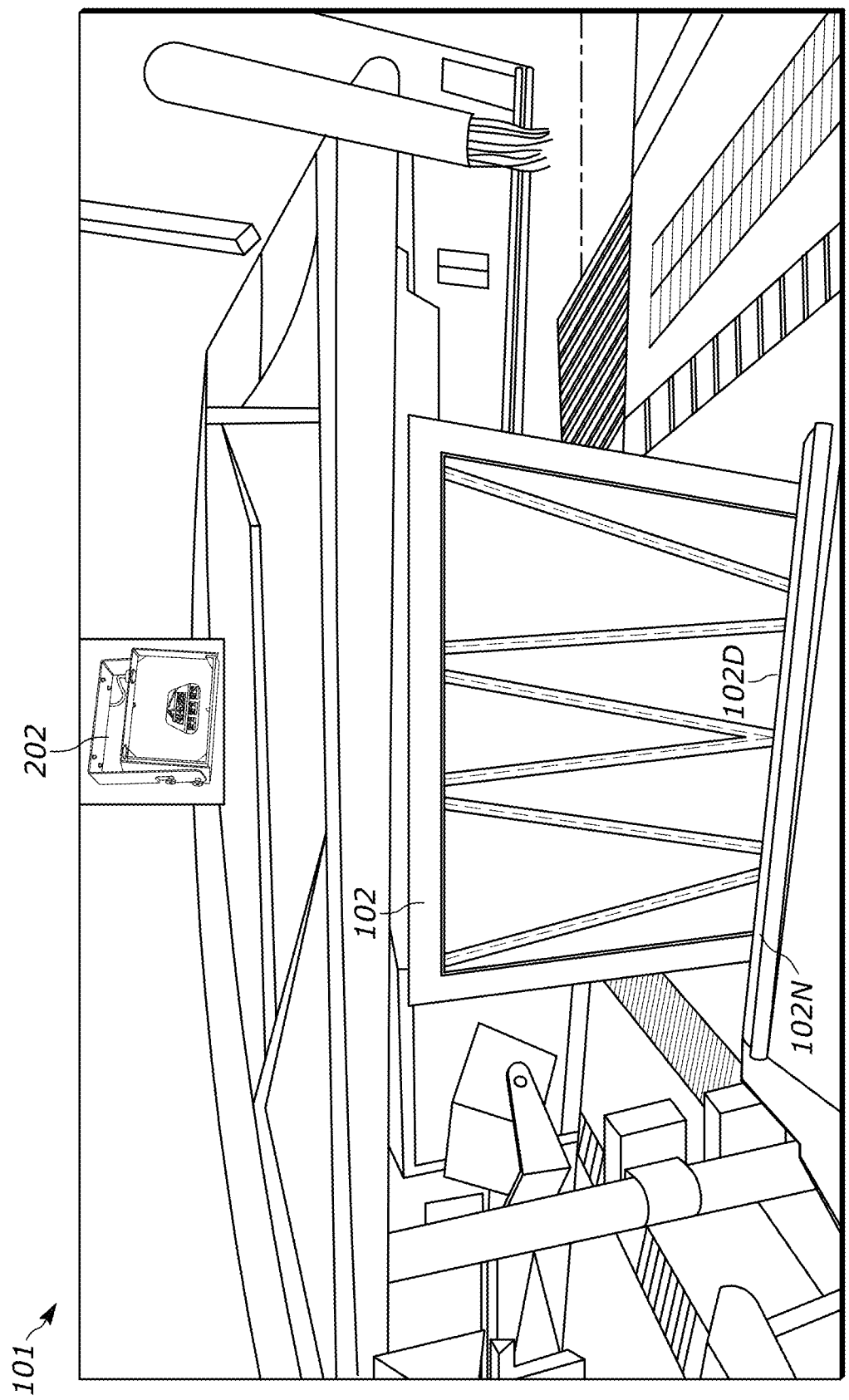
FIG. 1B is the perspective view of FIG. 1A where the shipping container is associated with a door closed status type, in accordance with example embodiments herein.

FIG. 1A additionally depicts, within predefined search space 101, personnel or loaders 105 and 106 that may load packages 104 and 107 into the shipping container 102. In the embodiment of FIG. 1A, shipping container 102 may be loaded by loaders 105 and 106 with packages 104 and 107 during a loading session. The loading session includes loading a set or group of identified packages (e.g., packages 104 and 107) into shipping container 102. The loaders 105 and 106 and packages 104 and 107, by movement through the predefined search space 101, may generally cause occlusion and interference with the 3D-depth camera 202 (as discussed for FIG. 2) capturing 3D image data, over time, of shipping container 102. FIG. 1B is the perspective view of FIG. 1A where shipping container 102 is associated with a door closed status type, in accordance with example embodiments herein. For example, FIG. 1B depicts shipping container 102, door 102d, frontal area 102n, and 3D-depth camera 202 as described herein with respect to FIG. 1A. In the embodiment of FIG. 1B, door 102d is depicted as closed or in a closed position. As described herein, in various embodiments, the closed positioned may be associated with a door closed status type. In the embodiment of FIG. 1B, interior area 102b of shipping container 102 is hidden from view by door 102d. In the embodiment of FIG. 1B, near door area 102d includes a portion of door 102d as closed near the opening of shipping container 102.

Figure 1C:
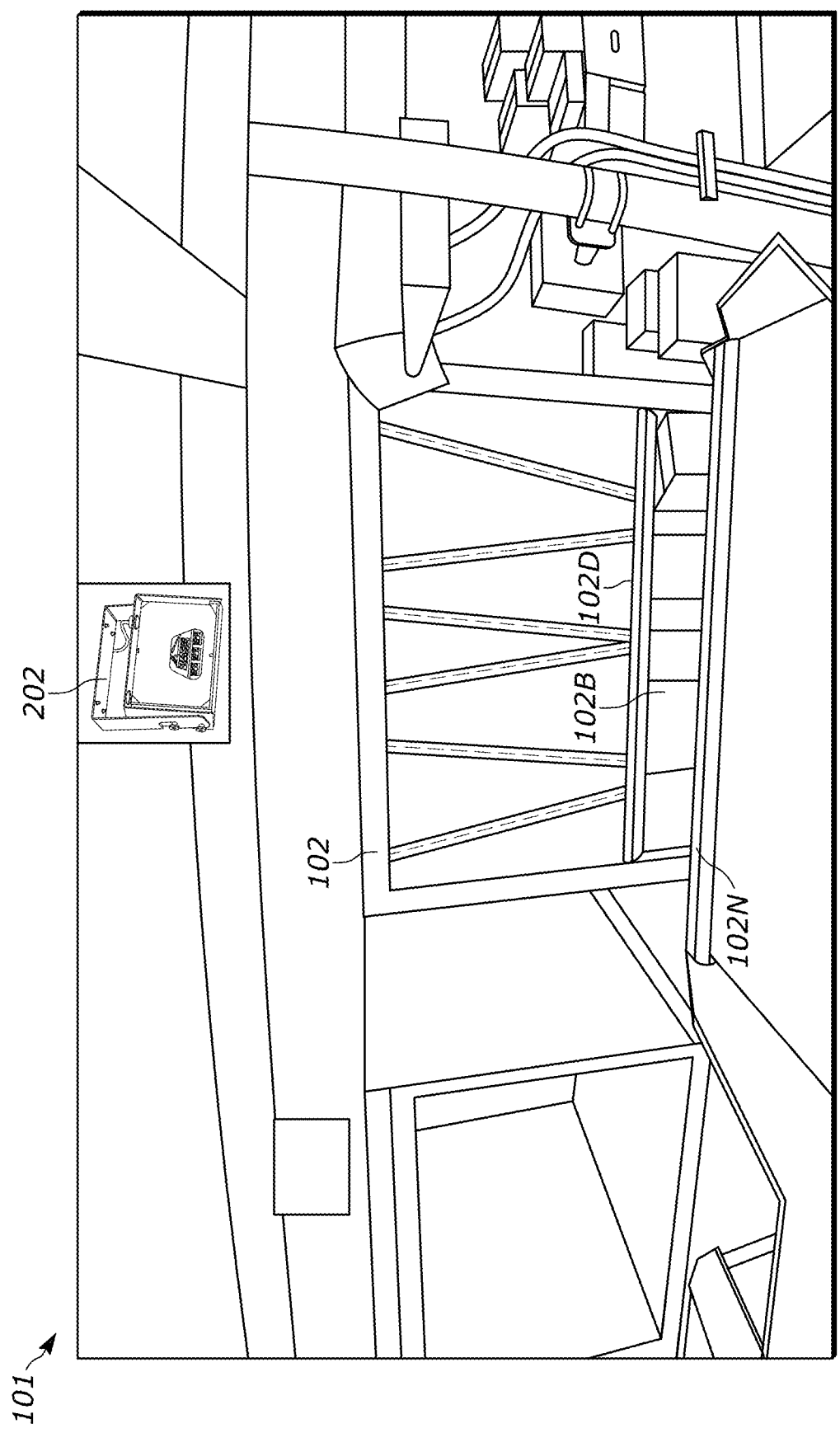
FIG. 1C is the perspective view of FIG. 1A where the shipping container is associated with a door partially closed status type, in accordance with example embodiments herein.

FIG. 1C is the perspective view of FIG. 1A where the shipping container 102 is associated with a door partially closed status type, in accordance with example embodiments herein. For example, FIG. 1C depicts shipping container 102, door 102d, interior area 102b, frontal area 102n, and 3D-depth camera 202 as described herein with respect to FIG. 1A. In the embodiment of FIG. 1C, door 102d is depicted as partially closed or in a partially closed position. As described herein, in various embodiments, the partially closed positioned may be associated with a door partially closed status type. In the embodiment of FIG. 1B, interior area 102b of shipping container 102 is visible behind door 102d. In the embodiment of FIG. 1B, near door area 102d includes a portion of door 102d as partially closed near the opening of shipping container 102.

Figure 1D:
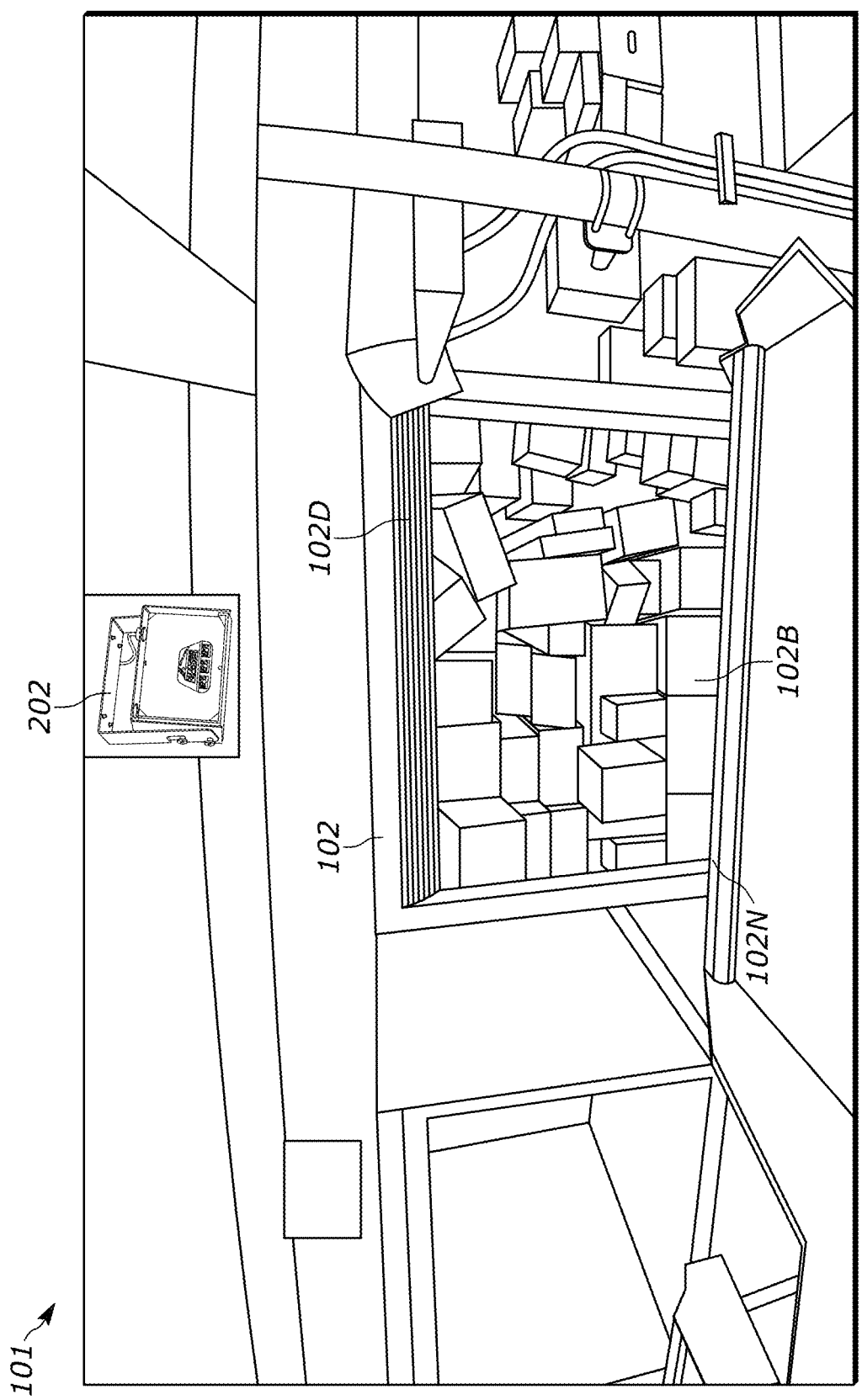
FIG. 1D is the perspective view of FIG. 1A where the shipping container is associated with a door opened, package-full status type, in accordance with example embodiments herein.

FIG. 1D is the perspective view of FIG. 1A where the shipping container 102 is associated with a door opened, package-full status type, in accordance with example embodiments herein. For example, FIG. 1D depicts shipping container 102, door 102d, interior area 102b, frontal area 102n, and 3D-depth camera 202 as described herein with respect to FIG. 1A. In the embodiment of FIG. 1D, door 102d is depicted as opened or an opened position where container 102 is full of packages. As described herein, in various embodiments, the opened positioned (where the shipping container is full of packages) may be associated with a door opened, package-full status type. In the embodiment of FIG. 1D, interior area 102b of shipping container 102 is visible behind door 102d, and is full (or at least mostly full) of packages. In the embodiment of FIG. 1D, near door area102d includes frontal area 102n near the opening of door 102d of shipping container 102.

Figure 2:
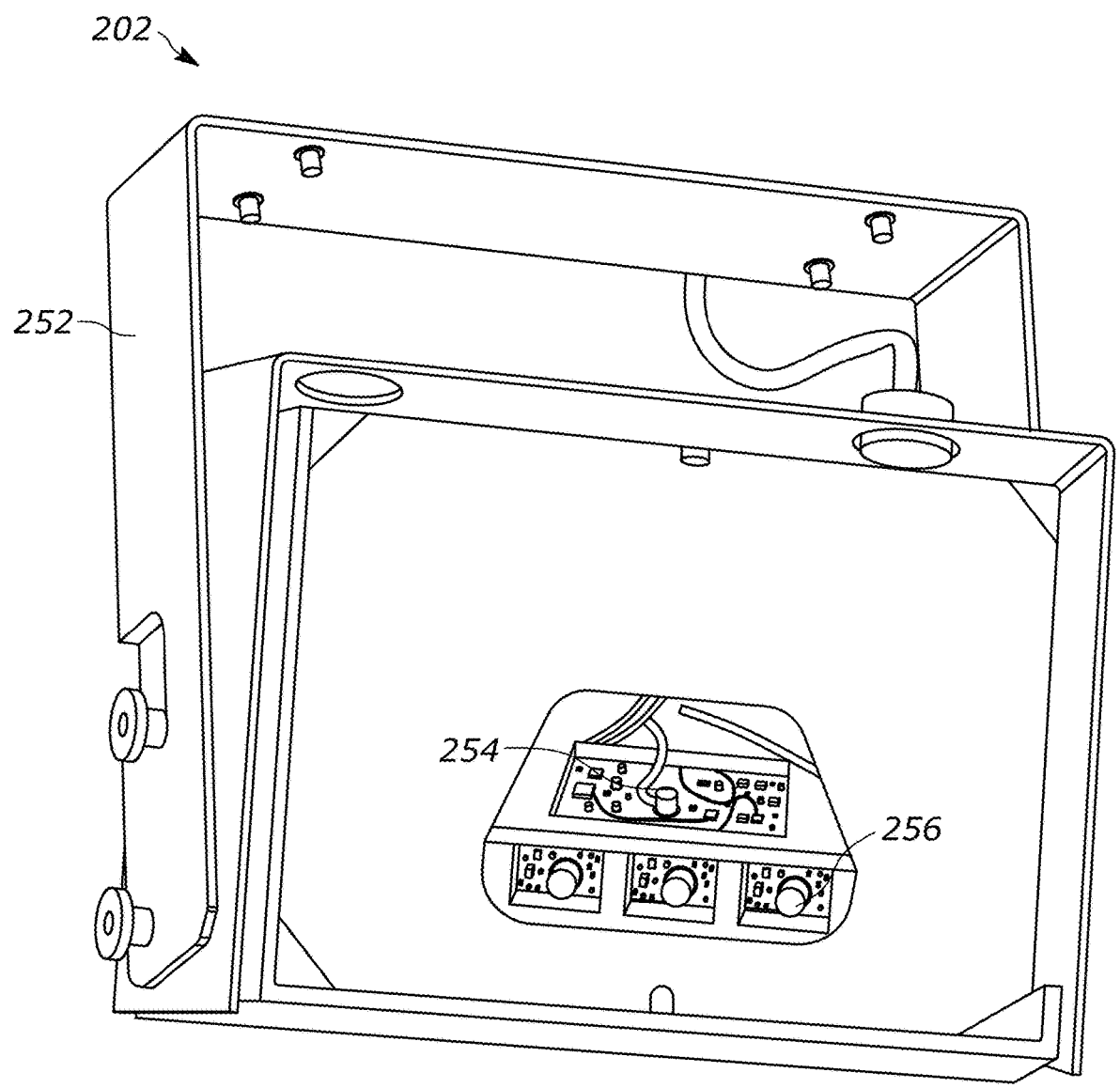
FIG. 2 is a perspective view of the LMU of FIG. 1A, in accordance with example embodiments herein.

FIG. 2 is a perspective view of the LMU of FIG. 1, in accordance with example embodiments herein. In various embodiments, LMU 202 is a mountable device. Generally, an LMU 202 comprises camera(s) and a processing board and is configured to capture data of a loading scene (e.g., a scene including any of FIGS. 1A, 1B, 1C, and/or 1D described herein). LMU 202 may run container fullness estimation and other advanced analytical algorithms.

LMU 202 may include a 3D-depth camera 254 for capturing, sensing, or scanning 3D image data/datasets. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., predefined search space 101) or objects within the predefined search area 101, such as boxes or packages (e.g., packages 104 and 107) and storage container 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of predefined search space 101. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D-depth camera 254, for example, the predefined search space 101 and any objects, areas, or surfaces therein.

LMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the LMU 202 can have both sets of 3D image data and 2D image data available for a particular surface, object, area, or scene at the same or similar instance in time.

In various embodiments as described herein, LMU 202 may be a mountable device that includes a 3D-depth camera for capturing 3D images (e.g., 3D image data/datasets) and a photo-realistic camera (e.g., 2D image data/datasets). The photo-realistic camera may be an RGB (red, green, blue) camera for capturing 2D images, such as the image of FIG. 1. LMU 202 may also include one or more processors and one or more computer memories for storing image data, and/or for executing apps that perform analytics or other functions as described herein. In various embodiments, and as shown in FIG. 1, the LMU 202 may be mounted within a loading facility and oriented in the direction of predefined search space 101 to capture 3D and/or 2D image data of shipping container 102. For example, as shown in FIG. 1, LMU 202 may be oriented such that the 3D and 2D cameras of LMU 202 may capture 3D image data of shipping container 102, e.g., where LMU 202 may scan or sense the walls, floor, ceiling, packages, or other objects or surfaces within the predefined search space 101 to determine the 3D and 2D image data. The image data may be processed by the one or more processors and/or memories of the LMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that LMU 202 may capture 3D and/or 2D image data/datasets of a variety of loading facilities or other areas, such that additional loading facilities or areas (e.g., warehouses, etc.) in addition to the predefined search spaces (e.g., predefined search space 101) are contemplated herein.

In some embodiments, for example, LMU 202 may process the 3D and 2D image data/datasets, as scanned or sensed from the 3D-depth camera and photo-realistic camera, for use by other devices (e.g., client device 600 or server 301, as further described herein). For example, the one or more processors and/or one or more memories of LMU 202 may capture and/or process the image data or datasets scanned or sensed from a predefined search space (e.g., any of the views of FIGS. 1A through 1D). The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a dashboard app that may be, for example, installed and executing on client device 600 (as further described herein with respect to FIG. 6), for viewing, manipulation, or otherwise interaction. In other embodiments, the image data and/or the post-scanning data may be sent to a server (e.g., server 301 as further described herein) for storage or for further manipulation. For example, the image data and/or the post-scanning data may be sent to a server, such as server 301. In such embodiments, the server or servers may generate post-scanning data that may include metadata, simplified data, normalized data, result data, status data, or alert data as determined from the original scanned or sensed image data provided by LMU 202. As described herein, the server or other centralized processing unit and/or storage may store such data, and may also send the image data and/or the post-scanning data to a dashboard app, or other app, implemented on a client device, such as the dashboard app implemented on client device 600 of FIG. 7.

LMU 202 may include a mounting bracket 252 for orienting or otherwise positioning the LMU 202 within a loading facility associated with predefined search space 101 as described herein for FIGS. 1A through 1D. The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices (such as server 301 of FIG. 3 as described herein). The network interface of LMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

Figure 3:
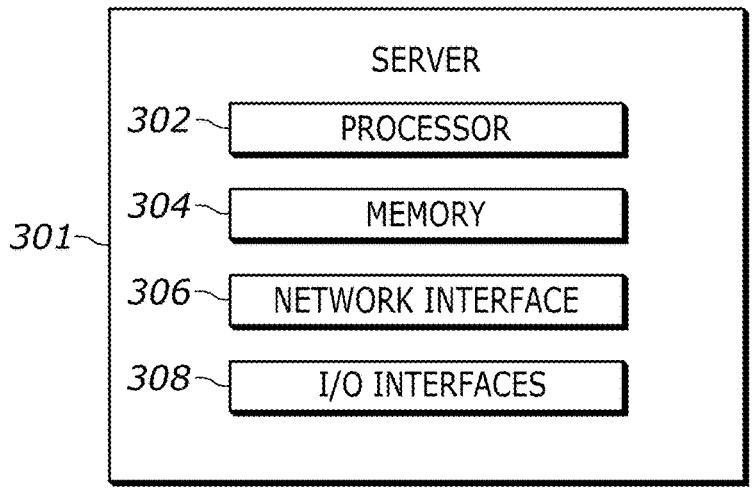
FIG. 3 is a block diagram representative of an embodiment of a server associated with the loading facility of FIG. 1 and the 3D-depth camera of FIG. 2.

FIG. 3 is a block diagram representative of an embodiment of a server associated with the loading facility of FIG. 1 and the LMU 202 of FIG. 2. In some embodiments, server 301 may be located in the same facility as loading facility of FIG. 1. In other embodiments, server 301 may be located at a remote location, such as on a cloud-platform or other remote location. In either embodiment, server 301 may be communicatively coupled to a 3D-depth camera (e.g., LMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4:
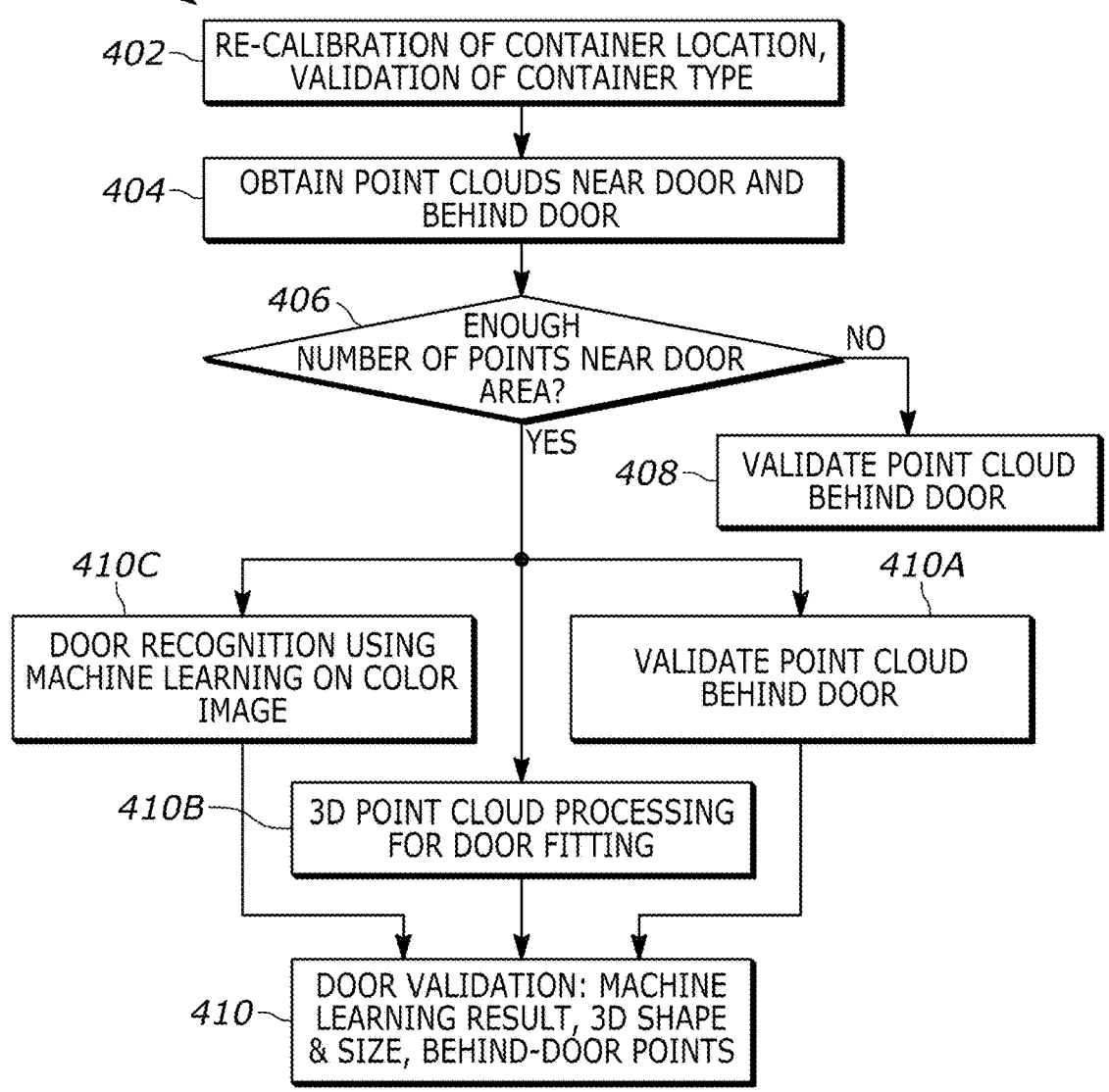
FIG. 4 is a flow chart for a 3D depth imaging method for automatic container door status recognition, in accordance with example embodiments herein.

FIG. 4 is a flow chart for a 3D depth imaging method 400 for automatic container door status recognition, in accordance with example embodiments herein. At block 402, a recalibration of a localization of shipping container 102 is executed. A shipping container may be selected from one of several differently dimensioned containers. In particular, the recalibration determines a predefined search space for imaging the shipping container during a loading session. Generally, the predefined search space is determined based on the parameters ("priors information") of a known shipping container type, e.g., a ULD type. Such priors information can include any of container type, location, door type, shape and size. Such information is either provided by a user or is pre-calibrated before a loading session. In some embodiments, before a loading session begins, recalibration and validation of container location, type, etc. is conducted with the priors information. For example, recalibration of a location of a shipping container (e.g., shipping container 102) may include setting up 3D and/or 2D cameras to image the shipping container in a particular defined location. In addition, U.S. application Ser. No. 16/509,228, entitled "Three-Dimensional (3D) Depth Imaging Systems and Methods for Dynamic Container Auto-Configuration," the entire disclosure of which is hereby expressly incorporated by reference herein, discloses systems and methods regarding recalibration and localization of a shipping container.

As described in various embodiments herein, a shipping container may be a ULD, but, more generally, may be an aircraft-based shipping container. Further, at block 402, shipping container 102 may be determined or validated as having a particular shipping container type (e.g., a shipping container type of "AMJ" as shown for FIGS. 1A-1D). In various embodiments, the shipping container type may be any one of a ULD type being one of: an AMJ type, an AAD type, an AKE type, an AYY type, a SAA type, an APE type, or an AQF type. In still further embodiments, the shipping container type may define a split-scale container having a first door and a second door. In such embodiments, a first door of the split-scale container may be classified as having a first door status type and the second door may be classified as having a second door status type. The first door and/or second door status types may be selected from any one or more of the door status types (open, closed, etc.) as described herein.

At block 404, method 400 includes obtaining 3D point clouds of objects and/or areas near and/or behind door 102d. In various embodiments, this includes capturing, by a 3D-depth camera (e.g., 3D-depth camera 202), 3D image data of shipping container 102 located in a predefined search space (e.g., a predefined search space of any of FIGS. 1A-1D) during a shipping container loading session. In various embodiments, the 3D image data may be 3D point cloud data, including 3D point cloud of one or more objects or areas (e.g., shipping container 102, door 102d, interior area 102b, and/or frontal area102n) of predefined search space as depicted in any of FIGS. 1A to 1D.

Further, at block 404, method 400 may further include receiving, by a container recognition application (app) executing on one or more processors, the 3D image data. In some embodiments, the one or more processors may be the one or more processors of the 3D-depth camera 202 as described herein. Additionally, or alternatively, the one or more processors are located at a server (e.g., server 301) communicatively coupled to 3D-depth camera 202 via a digital network as described herein with respect to FIGS. 2 and 3.

Further, at block 404, method 400 may further include determining, by the container recognition app based on the 3D image data, a container point cloud representative of the shipping container (e.g., shipping container 102). In addition, method 400 may further include determining, by the container recognition app from the 3D image data, a 3D image door area data subset defining one or more door areas of one or more corresponding doors of the shipping container (e.g., shipping container 102). Each door area of the one or more door areas may comprise a near-door image data section and a behind-door image data section. In various embodiments, near-door image data section corresponds to frontal area 102n, and behind-door image data section corresponds to 102 interior area 102b, of shipping container 102 as depicted and described herein with respect to FIGS. 1A to 1D.

Figure 5A:
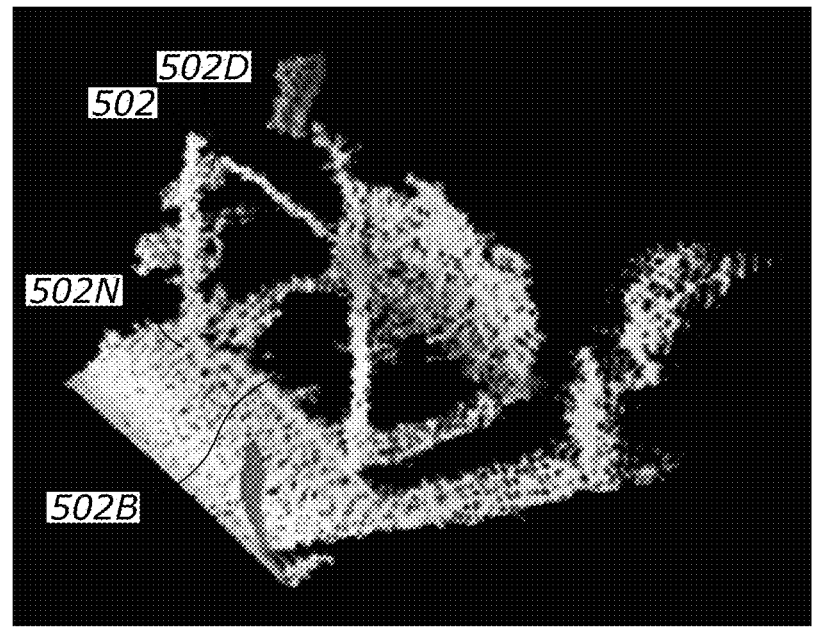
FIGS. 5A and 5B illustrate example embodiments of 3D image data of shipping containers as captured in accordance with the method of FIG. 4, and in accordance with example embodiments herein.
Figure 5B:
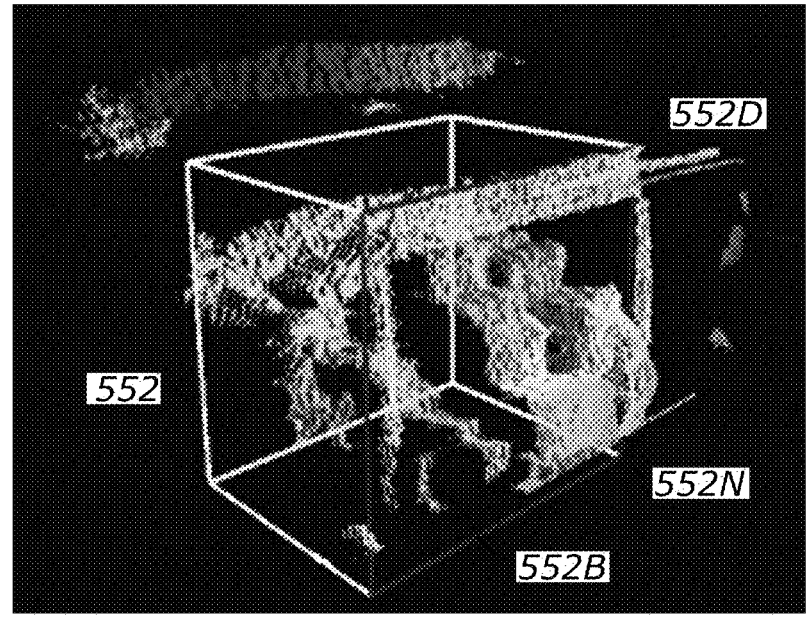

FIGS. 5A and 5B illustrate example embodiments of 3D image data of shipping containers as captured in accordance with the method of FIG. 4, and in accordance with example embodiments herein. For example, FIG. 5A may define 3D image data representing shipping container 102 of FIG. 1A with door 102d in an opened position. In the embodiment of FIG. 5A, 3D image area 502d corresponds to door 102d of shipping container 102 of FIG. 1A. Moreover, in the embodiment of FIG. 5A, 3D image area 502b corresponds to interior area 102b of shipping container 102 as visible behind door 102d. In addition, the embodiment of FIG. 5A, 3D image area 502n corresponds to frontal area 102n near the opening of door 102d of shipping container 102. Any one or more of 3D image area 502d, 3D image area 502b, and/or, 3D image area 502n corresponds to the 3D image door area data subset of the 3D image data of FIG. 5A.

Similarly, FIG. 5B may define 3D image data representing shipping container 102 of FIG. 1D with door 102d depicted as opened or in an opened position where container 102 is full of packages. In the embodiment of FIG. 5B, 3D image area 552d corresponds to door 102d of shipping container 102 of FIG. 1D. Moreover, in the embodiment of FIG. 5B, 3D image area 552b corresponds to interior area 102b of shipping container 102 as full of packages. In addition, the embodiment of FIG. 5B, 3D image area 552n corresponds to frontal area 102n near the opening of door 102d of shipping container 102 of FIG. 1D. Any one or more of 3D image area 552d, 3D image area 552b, and/or, 3D image area 552n corresponds to the 3D image door area data subset of the 3D image data of FIG. 5B. In the embodiment of FIG. 5B, shipping container 102 is shown as recalibrated and localized with 3D image data captured and manipulated in accordance with the recalibration and/or localization such that the 3D image data fits with bounded area 552, which represents the dimensions of shipping container 102.

With respect to FIG. 4, at block 406 method 400 includes determining, by the container recognition app from the 3D image door area data subset, a status type of each of the one or more corresponding doors. The status type may be selected from one of: (a) a door opened status type, (b) a door closed status type, or (c) a door partially closed status type. For example, in various embodiments the container recognition app analyzes the 3D points located near the door area (e.g., within the 3D image door area data subset, as shown for FIGS. 5A and/5B). In particular, one or more threshold value(s) of 3D image points are determined and analyzed, e.g., from Gaussian distribution of the 3D points near the door area. In some embodiment, the 3D image points of the image door area data subset(s) may be analyzed with machine learning algorithms or models as described herein. More generally, an abundance of 3D points (e.g., a high density of 3D points) detected near the door area (e.g., of 3D image area 502n corresponding to frontal area 102n near the opening of door 102d of shipping container 102) indicates that the door is in a closed position. By contrast, a low density of 3D points corresponding to frontal area 102*n* near the opening of door 102*d* of shipping container 102) indicates that the door is in an open position. In addition, a low density of 3D points could indicate a low frequency of 3D points behind the door location, which suggest that the door 102*d* is open.

At block 408, method 400 includes identifying or validating point cloud data behind a door (e.g., identifying or validating 3D image area 502*b* corresponds to interior area 102*b* of shipping container 102). From such identification, validation, or analysis the container recognition app determines that the status type of a door 102*d* is of the door opened status type. Such analysis is responsive to the container recognition app detecting, within the 3D image door area data subset, a low density of 3D points of the near-door image data section (e.g., 502*n*) and a high density of 3D points of the behind-door image data section (e.g., 502*b*). As the term is used herein, "low density" is a density that is low compared to previous 3D image data as captured for a shipping container of the same shipping container type. Low density data captures tend to indicate that no door, door surface, or door face occupies the area represented by the near-door image data. In contrast, "high density" is high compared to previous 3D image data captures of a shipping container of the same shipping container type. High density data captures tend to indicate that a door, a door surface, or a door face occupies the area represented by the near-door image data.

At block 410, method 400 includes execution of one or more algorithms or processes (at blocks 410*a*, 410*b*, and/or 410*c*), where at block 410, the results of such algorithms or processes (e.g., including door validation, machine learning, 3D shape, & size, and 3D data points, such as behind-door point) are analyzed to determine the door status type of door 102*d*. Generally, block 410 represents a method for container door open/close recognition and/or door height estimation in the case of closed or partially closed doors, or open doors but where a container is full of packages, using both RGB and 3D/depth images for a large variety of containers. For example, if at block 406, enough number of 3D points are near the door area of the 3D image ("Y"), then the container recognition application will analyze the 3D point cloud data (and possibly RGB data) to determine whether the door is partially or fully open.

At block 410*a*, method 400 includes validation of a point cloud behind door 102*d*. This process is similar to block 408. For example, container recognition app validates, identifies, or analyzes point cloud data behind door 120*d* to determine if the door is door partially or fully closed. If there is sufficient number of points near the door area, the following analysis will proceed: 1) deploy the pretrained door classifier/model (block 410*b*) to classify the door area as a real door (e.g., door 102*d*) as compared to any other object, e.g. packages, persons, etc.; 2) analyze the point cloud in terms of shape and size, and validate (e.g., with a ground truth in the prior); and/or 3) assess the point cloud behind door (e.g., 502*b* or 552*b*).

At block 410*b*, method 400 includes 3D point cloud processing for door fitting. At block 410*b*, container recognition app may estimate, based on the 3D image data, the percentage that the door (e.g., 102*d*) closed. In some embodiments, for example, a machine learning model can validate, classify, or determine the point cloud behind the door, such as the percentage the door is closed. Based on such analysis, either a door fully closed or a partially closed status will be assigned. In some embodiments, if all the three conditions are met including, i.e., 1) the door size and shape is validated with the ground truth, positively; 2) the machine learning result classifies the object as a real door; and 3) there are few points behind the door, then the door is recognized as fully closed. Otherwise a partial closed status may be assigned, and the door height from the ground (the lowest boundary of the door from ground) will be estimated, which can be used as the percentage door closed value.

In particular, with respect to some embodiments, the container recognition app determines that the status type of a door (e.g., door 102*d*) is the door closed status type. Such determination may be responsive to the container recognition app detecting, within the 3D image door area data subset, a high density of 3D points of the near-door image data section and a low density of 3D points of the behind-door image data section. Low density may also be a zero or near-zero density.

Additionally, or alternatively, in further embodiments, the container recognition app determines that the status type of a door (e.g., door 102*d*) is the door partially closed status type. Such determination may be responsive to the container recognition app detecting, within the 3D image door area data subset, a first partial density of 3D points of the near-door image data section and a second partial density of 3D points of the behind-door image data section. In such embodiments, the container recognition app may determine, based on the first partial density of 3D points of the near-door image data section and the second partial density of 3D points of the behind-door image data section, a percentage closed value of the first door. In addition, such embodiments, the container recognition app may determine, based on the first partial density of 3D points of the near-door image data section and the second partial density of 3D points of the behind-door image data section, an estimated height of the first door above a bottom portion of the shipping container.

In still further embodiments, at block 410*b*, 3D image data may be captured periodically (e.g., the 3D image data is captured at any of: every 30 seconds, every minute, or every two minutes). In such embodiments, the 3D image data is captured at a first data capture period and a second data capture period where the status type of a door (e.g., door 102*d*) is determined based on a first status type previously determined at the first data capture period and a second status type previously determined at the second data capture period. This "temporal filtering" may be used, additionally or alternatively, to determine the status type of a door. For example, door status recognition, as performed by container recognition app, is further improved using temporal filtering across multiple frames. For example, the door status can be filtered based on the observation that during normal loading period, the container door won't switch status frequently, i.e. it stays open or closed for a while.

In embodiments using the 3D classification model, the 3D classification model may be trained with Gaussian distribution values of the 3D image data corresponding to the shipping container type. Any known classifier algorithm can be used to train the 3D classification model, including, for example, SVM, Neural Network, AdaBoost, Deep Learning, etc. For example, in various embodiments, a 3D classification model may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as door areas of shipping container in 3D image data) in order to facilitate making predictions for subsequent data (to determine a door status).

Machine learning model(s), such as those of 3D classification model, may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

At block 410*b*, a 3D classification model may be trained by an artificial intelligence (AI)-based algorithm with 3D image data corresponding to the shipping container type. In such embodiments, the container recognition app implements the 3D classification model on one or more processors to determine, based on the near-door image data section of a door and the behind-door image data section of the door, the status type of the door. In some embodiments, the status type can also be determined based on a threshold value, e.g., a threshold value of a Gaussian distribution or threshold density value of 3D image points at the near-door image data section and/or behind-door data section, without use of an AI model.

At block 410*c*, method 400 includes door recognition using machine learning on color (e.g., red-green-blue, RGB) images. This may include a 2D image classifier. The use of color (RGB) images at block 410*c* is used to increase the accuracy of the prediction and/or classification of 3D image classification as described herein with respect to blocks 410*a* and/or 410*b*. For example, a 2D image classification model of block 410*c* may be trained on many (hundreds or thousands) of images of open and closed doors. Such 2D image classification model may then be called when the 3D classification model of block 410*a* can't accurately predict (e.g., within 90 percent confidence) whether a shipping container door (e.g., door 102*d*) is in an opened, closed, etc. position. Once the 2D classification model is executed, and its results are combined with the 3D image results of block 410*b*, and the validation results of block 410*a*, then at block 410, an enhanced prediction or classification as to the door status may be provided. That is, together, color/RGB image classification (410*c*), 3D image classification (410*b*), and 3D point validation (410*a*) maybe combined for an enhanced predication at block 410 as described herein.

In particular, with respect to block 410*c*, a two-dimensional (2D) camera configured to capture 2D image data may be oriented in a direction to capture 2D image data of the shipping container (e.g., shipping container 102) located in the predefined search space during a shipping container loading session. In such embodiments, the container recognition app may be configured to execute on the one or more processors and to receive the 2D image data. For example, in some embodiments, the 3D-depth camera, the 2D camera, and the one or more processors are housed in a mountable device (e.g., the LMU).

In various embodiments, the 2D image data defines a red-green-blue (RGB) 2D representation of the shipping container. In such embodiments, the container recognition app may further be configured to execute on the one or more processors to generate an enhanced RGB prediction based on the 2D image data. The enhanced RGB prediction indicates the status type of the door (e.g., door 102*d*) of the shipping container.

In various embodiments, the RGB prediction is an enhanced prediction because, the RGB prediction is combined with the container recognition app's determination based on the 3D image door area data subset to result in a prediction based on each of the 3D image data and the 2D image data. In this way, the disclosure herein provides for container door open/close recognition and door height estimation in the case of open, closed, and/or partially closed doors, using both RGB and depth images for a large variety of containers. The use of both color and depth information significantly improves the robustness and accuracy of the door status recognition, by identifying the most challenging cases (e.g., door configurations) reliably.

For example, the container recognition app may make a percentage or threshold based prediction of the door status type on each of the 3D image data and 2D image data (e.g., 90% door opened status type for the 3D image data and 95% door opened status type for the 2D image data) to produce an averaged, median, weighted, or other combined data analysis to arrive a combined score (e.g., an average of 92.5% confidence of a door opened status type).

In other embodiments, the enhanced RGB prediction may override or replace the container recognition app's determination based on the 3D image. For example, in such embodiments, where 3D image data analysis alone falls below a 90% confidence, the enhanced RGB prediction alone may be used to determine the door status type.

The enhanced RGB prediction may be used to detect door opened, package-full status types. For example, at least in one embodiment, the door status types may further include a "door opened, package-full status type." The container recognition may app determines that the status type of a door (e.g., door 102*d*) is the door opened, package-full status type responsive to the container recognition app detecting, within the 3D image door area data subset, a high density of 3D points of the near-door image data section, a low density of 3D points of the behind-door image data section, and an enhanced RGB prediction indicating a package wall at the door area of the first door.

The enhanced RGB prediction may be based on a 2D classification model as described herein. For example, a 2D classification model trained by an artificial intelligence (AI)-based algorithm with 2D image data corresponding to the shipping container type. For example, the 2D classification model may be trained with a plurality of 2D images corresponding to the shipping container type. Each of the 2D images may correspond to the different shipping container types, such that the 2D classification model may classify various types of differently dimensioned containers. In addition, any known image features can be used to train the 2D classification model. For example, color histograms in the hue/saturation space may be used to train the 2D classification model. Once trained, the container recognition app may implement the 2D classification model on the one or more processors to determine, based on the 2D image data, the enhanced RGB prediction.

In various embodiments, if a container comprises a split scale, e.g. smaller containers such as AKE/AYY, a point cloud may need to be split into two even regions/sets horizontally (left-right) due to the nature of the split scale. In such embodiments, the left and right regions will be analyzed in a similar way as a typical container (e.g., shipping container 102), i.e., a single scale case, as described herein. The three door status will be assigned to each split scale container. For example, if a shipping container is a SAA type of container that has a unique 3-door panels, 3D images (e.g., of point cloud captured for that shipping container) would be split horizontally and evenly into three regions, and analyzed separately. The three door statuses will be assigned to each of the three doors for SAA in as described herein with respect to FIG. 4. Thus, as described herein, in embodiments where the shipping container type defines a split-scale container having a first door and a second door, the first door is classified as having a first door status type and the second door is classified as having a second door status type.

Figure 6:
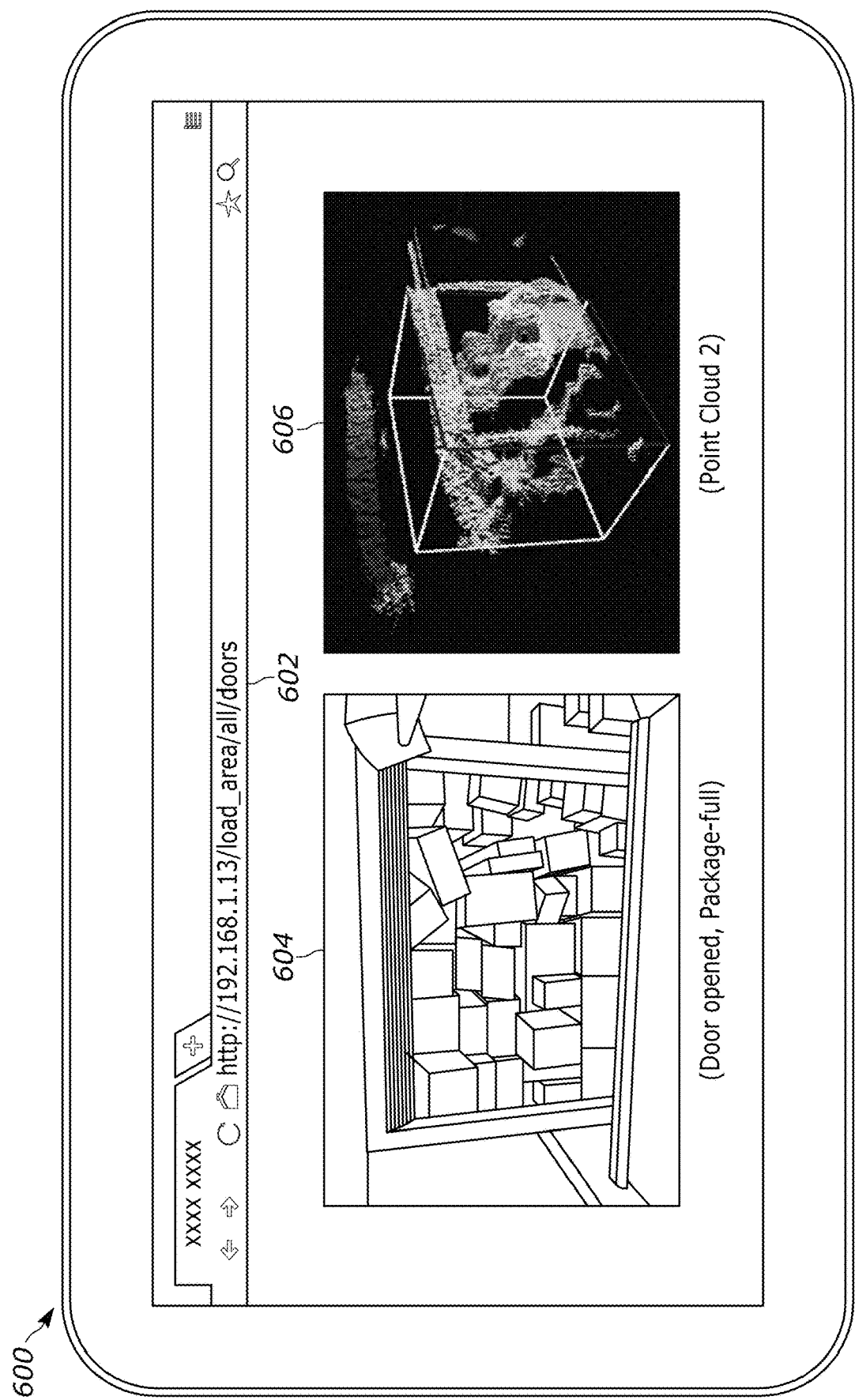
FIG. 6 illustrates a client device displaying a guided user interface (GUI) graphically indicating the status type of each of the one or more corresponding doors in accordance with FIG. 4, and in accordance with example embodiments herein.

FIG. 6 illustrates a client device 600 displaying a guided user interface (GUI) 602 graphically indicating the status type of each of the one or more corresponding doors in accordance with FIG. 4, and in accordance with example embodiments herein. In some embodiments, GUI 602 may be rendered by a dashboard app installed and executing on client device 600. Dashboard app may also display various operational metrics (not shown), which may include, for example, the start and end of the load for each container, the container idle time before its being loaded, the container idle time after its door is closed, etc. Such metrics provide valuable insights to users of the GUI, and overall system, for operational improvement.

In various embodiments, image data/datasets and/or operational metrics (as described herein) may be received on client device 600. Client device 600 may implement the dashboard app to receive the image data and/or the operational metrics and display such data, e.g., in graphical or other format, to a manager or loader to facilitate the unloading or loading of packages (e.g., 104, 107, etc.), as described herein. In some embodiments, dashboard app may be implemented as part of Zebra Technologies Corps.'s SmartPack™ container loading analytics (CLA) solution. The dashboard app may be installed on client devices (such as client device 600) operating in loading and shipping facilities (e.g., a loading facility as depicted by FIG. 1). Dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 600.

In some embodiments, the dashboard app may receive the image data/datasets and/or operational metrics and display such data in real-time. Client device 600 may be a mobile device, such as a tablet, smartphone, laptop, or other such mobile computing device. Client device 600 may implement an operating system or platform for executing the dashboard (or other) apps or functionality, including, for example, any of the Apple iOS platform, the Google Android platform, and/or the Microsoft Windows platform. Client device 600 may include one or more processors and/or one or more memories implementing the dashboard app or for providing other similar functionality. Client device 600 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In the embodiment of FIG. 6, client device 600 shows a GUI screen of a predefined search space having a target container a (e.g., predefined search space 101 having shipping container 102) as depicted for FIG. 1D together the 3D image data of FIG. 5B as the result of algorithm 400 as described with respect to FIG. 4. In addition, GUI screen of client device 600 depicts the status type of door 102d is shown as "door opened, package full." In this way, the GUI is able to provide information as to the door status type in order to operational efficiency and improvement.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A three-dimensional (3D) depth imaging system for automatic container door status recognition, the 3D depth imaging system comprising:

a 3D-depth camera configured to capture 3D image data, the 3D-depth camera oriented in a direction to capture 3D image data of a shipping container located in a predefined search space during a shipping container loading session, the shipping container having a shipping container type; and a container recognition application (app) configured to execute on one or more processors and to receive the 3D image data, the container recognition app configured to determine, based on the 3D image data, a container point cloud representative of the shipping container, wherein the container recognition app is further configured to execute on the one or more processors to determine, from the 3D image data, a 3D image door area data subset defining one or more door areas of one or more corresponding doors of the shipping container, each door area of the one or more door areas comprising a near-door image data section and a behind-door image data section, and wherein the container recognition app is further configured to execute on the one or more processors to determine, from the 3D image door area data subset, a status type of each of the one or more corresponding doors, the status type selected from one of:

(a) a door opened status type, (b) a door closed status type, or (c) a door partially closed status type.

2. The 3D depth imaging system of claim 1, wherein the container recognition app determines that the status type of a first door of the one or more corresponding doors is the door opened status type responsive to the container recognition app detecting, within the 3D image door area data subset, a low density of 3D points of the near-door image data section and a high density of 3D points of the behind-door image data section.

3. The 3D depth imaging system of claim 1, wherein the container recognition app determines that the status type of a first door of the one or more corresponding doors is the door closed status type responsive to the container recognition app detecting, within the 3D image door area data subset, a high density of 3D points of the near-door image data section and a low density of 3D points of the behind-door image data section.

4. The 3D depth imaging system of claim 1, wherein the container recognition app determines that the status type of a first door of the one or more corresponding doors is the door partially closed status type responsive to the container recognition app detecting, within the 3D image door area data subset, a first partial density of 3D points of the near-door image data section and a second partial density of 3D points of the behind-door image data section.

5. The 3D depth imaging system of claim 4, wherein the container recognition app determines, based on the first partial density of 3D points of the near-door image data section and the second partial density of 3D points of the behind-door image data section, a percentage closed value of the first door.

6. The 3D depth imaging system of claim 4, wherein the container recognition app determines, based on the first partial density of 3D points of the near-door image data section and the second partial density of 3D points of the behind-door image data section, an estimated height of the first door above a bottom portion of the shipping container.

7. The 3D depth imaging system of claim 1 further comprising:

a 3D classification model trained by an artificial intelligence (AI)-based algorithm with 3D image data corresponding to the shipping container type, wherein the container recognition app implements the 3D classification model on the one or more processors to determine, based on the near-door image data section of a first door and the behind-door image data section of the first door, the status type of the first door.

8. The 3D depth imaging system of claim 7, wherein the 3D classification model is trained with Gaussian distribution values of the 3D image data corresponding to the shipping container type.

9. The 3D depth imaging system of claim 7, wherein the shipping container type is a ULD type being one of: an AMJ type, an AAD type, an AKE type, an AYY type, a SAA type, an APE type, or an AQF type.

10. The 3D depth imaging system of claim 1, wherein the shipping container type defines a split-scale container having a first door and a second door, wherein the first door is classified as having a first door status type, and wherein the second door is classified as having a second door status type.

11. The 3D depth imaging system of claim 1, wherein the 3D image data is captured periodically, the 3D image data captured at a first data capture period and a second data capture period, wherein the status type of at least one of the one or more corresponding doors is determined based on a first status type previously determined at the first data capture period and a second status type previously determined at the second data capture period.

12. The 3D depth imaging system of claim 1 further comprising a two-dimensional (2D) camera configured to capture 2D image data, the 2D camera oriented in the direction to capture 2D image data of the shipping container located in the predefined search space during the shipping container loading session, wherein the container recognition app is configured to execute on the one or more processors and to receive the 2D image data, the 2D image data defining a red-green-blue (RGB) 2D representation of the shipping container, and wherein the container recognition app is further configured to execute on the one or more processors to generate an enhanced RGB prediction based on the 2D image data, the enhanced RGB prediction indicating the status type of the one or more corresponding doors.

13. The 3D depth imaging system of claim 12, wherein the status type further includes: (d) a door opened, package-full status type, and wherein the container recognition app determines that the status type of a first door of the one or more corresponding doors is the door opened, package-full status type responsive to the container recognition app detecting, within the 3D image door area data subset, a high density of 3D points of the near-door image data section, a low density of 3D points of the behind-door image data section, and the enhanced RGB prediction indicating a package wall at the door area of the first door.

14. The 3D depth imaging system of claim 12 further comprising:

a 2D classification model trained by an artificial intelligence (AI)-based algorithm with 2D image data corresponding to the shipping container type, wherein the container recognition app implements the 2D classification model on the one or more processors to determine, based on the 2D image data, the enhanced RGB prediction.

15. A three-dimensional (3D) depth imaging method for automatic container door status recognition, the 3D depth imaging method comprising:

capturing, by a 3D-depth camera, 3D image data of a shipping container located in a predefined search space during a shipping container loading session, the shipping container having a shipping container type;

receiving, by a container recognition application (app) executing on one or more processors, the 3D image data;

determining, by the container recognition app based on the 3D image data, a container point cloud representative of the shipping container;

determining, by the container recognition app from the 3D image data, a 3D image door area data subset defining one or more door areas of one or more corresponding doors of the shipping container, each door area of the one or more door areas comprising a near-door image data section and a behind-door image data section; and determining, by the container recognition app from the 3D image door area data subset, a status type of each of the one or more corresponding doors, the status type selected from one of:

(a) a door opened status type, (b) a door closed status type, or (c) a door partially closed status type.

16. The 3D depth imaging system of claim 12, wherein the 3D-depth camera, the 2D camera, and the one or more processors are housed in a mountable device.

17. The 3D depth imaging system of claim 1, wherein shipping container is selected from one of several differently dimensioned containers.

18. The 3D depth imaging system of claim 1, wherein the shipping container is a unit load device (ULD).

19. The 3D depth imaging system of claim 1, wherein the one or more processors are located at a server communicatively coupled to the 3D-depth camera via a digital network.

20. The 3D depth imaging system of claim 1, further comprising a dashboard app, the dashboard app executing on a client device implementing a guided user interface (GUI), the GUI graphically indicating the status type of each of the one or more corresponding doors.

21. The 3D depth imaging method of claim 15, wherein the container recognition app determines that the status type of a first door of the one or more corresponding doors is the door opened status type responsive to the container recognition app detecting, within the 3D image door area data subset, a low density of 3D points of the near-door image data section and a high density of 3D points of the behind-door image data section.

22. The 3D depth imaging method of claim 15, wherein the container recognition app determines that the status type of a first door of the one or more corresponding doors is the door closed status type responsive to the container recognition app detecting, within the 3D image door area data subset, a high density of 3D points of the near-door image data section and a low density of 3D points of the behind-door image data section.

23. The 3D depth imaging method of claim 15, wherein the container recognition app determines that the status type of a first door of the one or more corresponding doors is the door partially closed status type responsive to the container recognition app detecting, within the 3D image door area data subset, a first partial density of 3D points of the near-door image data section and a second partial density of 3D points of the behind-door image data section.

24. The 3D depth imaging method of claim 15 further comprising:
- capturing, by a two-dimensional (2D) camera, 2D image data of the shipping container located in the predefined search space during the shipping container loading session;
- receiving, by the container recognition app, the 2D image data, the 2D image data defining a red-green-blue (RGB) 2D representation of the shipping container; and
- generating, by the container recognition app, an enhanced RGB prediction based on the 2D image data, the enhanced RGB prediction indicating the status type of the one or more corresponding doors.

25. The 3D depth imaging method of claim 24, wherein the status type further includes: (d) a door opened, package-full status type, and wherein the container recognition app determines that the status type of a first door of the one or more corresponding doors is the door opened, package-full status type responsive to the container recognition app detecting, within the 3D image door area data subset, a high density of 3D points of the near-door image data section, a low density of 3D points of the behind-door image data section, and the enhanced RGB prediction indicating a package wall at the door area of the first door.

26. The 3D depth imaging method of claim 24 further comprising:
- implementing, by the container recognition app, a 2D classification model to determine, based on the 2D image data, the enhanced RGB prediction, wherein the 2D classification model is trained by an artificial intelligence (AI)-based algorithm with 2D image data corresponding to the shipping container type.

* * * * *